United States Patent
McMeekin et al.

(10) Patent No.: US 6,390,682 B1
(45) Date of Patent: May 21, 2002

(54) PLAIN BEARING

(75) Inventors: Kenneth Macleod McMeekin; Janette Johnston, both of Prestwick (GB)

(73) Assignee: Glacier Garlock Bearings, Inc., Wilmington, DE (US)

( * ) Notice: Subject to any disclaimer, the term of this patent is extended or adjusted under 35 U.S.C. 154(b) by 0 days.

(21) Appl. No.: 09/622,727

(22) PCT Filed: Mar. 3, 1999

(86) PCT No.: PCT/GB99/00628

§ 371 Date: Aug. 21, 2000

§ 102(e) Date: Aug. 21, 2000

(87) PCT Pub. No.: WO99/45285

PCT Pub. Date: Sep. 10, 1999

(30) Foreign Application Priority Data

Mar. 7, 1998 (GB) .............................................. 9804774

(51) Int. Cl.⁷ ............................ F16C 33/12; F16C 43/02
(52) U.S. Cl. ...................... 384/276; 384/300; 384/908; 29/898.055
(58) Field of Search ................................. 384/297, 298, 384/300, 911, 908, 279; 29/898.055, 898.15

(56) References Cited

U.S. PATENT DOCUMENTS

| | | | |
|---|---|---|---|
| 4,582,368 A | * 4/1986 | Fujita et al. | 384/300 X |
| 4,626,365 A | 12/1986 | Mori | 508/106 |
| 4,666,787 A | * 5/1987 | Bickle et al. | 384/908 X |
| 4,847,135 A | 7/1989 | Braus et al. | 428/138 |
| 5,364,682 A | * 11/1994 | Tanaka et al. | 384/908 X |
| 6,068,931 A | * 5/2000 | Adam et al. | 384/300 X |
| 6,296,392 B1 | * 10/2001 | McMeekin et al. | 384/279 |

FOREIGN PATENT DOCUMENTS

| | | |
|---|---|---|
| EP | 0183375 | 10/1985 |
| EP | 0232922 | 1/1987 |
| GB | 2166142 A | 4/1986 |
| GB | 2196876 B | 5/1990 |
| WO | WO 95/02772 | 7/1994 |

* cited by examiner

*Primary Examiner*—Thomas R. Hannon
(74) *Attorney, Agent, or Firm*—John M. Harrington; Kilpatrick Stockton LLP

(57) ABSTRACT

A plain bearing comprises a metallic backing, a sintered porous metal layer bonded to the backing and a lining layer infiltrated into the pores of the porous metal layer and overlying the sintered metal layer, said lining layer comprising PTFE containing 10–30% by vol. of particulate wear-resistant filler, 2–10% by vol. fibrillated aramid fibers and 2–10% by vol. of a melt processable fluoropolymer. The melt processable fluoropolymer is a copolymer of the group tetrafluoroethylene-hexafluoropropylene, tetrafluoroethylene-perfluoroalkylvinylether and monofluoroalkoxy. Such a bearing exhibits superior cavitation erosion resistance and may, by increasing the temperature and/or duration of the sintering operation that is normally performed after the mixture of ingredients has been applied to a backing material, be made to exhibit significantly improved fatigue strength.

16 Claims, 2 Drawing Sheets

PLAIN BEARING

This invention is concerned with plain bearings, in particular bearings which require to operate with (high) loading levels and low viscosity liquid lubricant.

In particularly heavily loaded bearing conditions wherein a low viscosity lubricant is used, as may be experienced for example in vehicle suspension parts such as dampers, and/or where fluid flows are severe, such as gear pumps, there is a need to provide a bearing surfaced with a lining material that exhibits both fatigue strength and resistance to erosion by such liquid.

Traditionally such bearings have been developed with lining materials of one or more layers of metal alloys chosen for their physical characteristics within the operating environment, but there is developing a trend to avoid using bearing metals as bearing linings, because of both cost and environment factors, and to use polymer based materials as bearing linings.

Plain bearings are known in which a backing strip of steel or comparable metal has formed thereon a lining layer comprising a porous metal matrix of sintered bronze and a low friction polymer-based material that incorporates fillers, hereinafter referred to as a filled polymer, infiltrated into the interstices of the sintered matrix forming a relatively thin overlying skin, or polymer layer.

It is known to infiltrate the low friction polymer-based material as a "mush" with an organic lubricant which is pressed into the interstices of the bronze matrix and heated to drive off volatile components and solidify it by a sintering action. It is also known to infiltrate the polymer-based material as a so-called "dry paper".

Such backed, infiltrated sintered bronze bearings are used both in oil lubricated bearings and also in dry bearings, wherein there is minimal lubricating fluid.

Polytetrafluoroethylene, hereafter referred to as "PTFE", has good tribological properties and is often used as, or in, a lining material for plain bearings as the main polymer or "base" polymer on which any mixture is based; however, PTFE is soft and weak and has an unacceptably high wear rate when used alone and for practicability requires the addition of so-called wear resistant fillers and/or other materials which reinforce the lining material against rapid wear and low load bearing strength.

Whereas in a dry or marginally lubricated bearing, and to a lesser extent an oil lubricated bearing, wear occurs as rubbing erosion which is directly responsible for removal of the filled PTFE, the rate of removal being determined by the roughness of the surface of the body borne by the bearing and thus the dynamic and break-away friction between the body and bearing, in an oil lubricated bearing, wear results from the lubricating oil bringing about cavitation erosion of the filled PTFE.

However, where fatigue strength and erosion resistance are important, polymer compositions which have been developed for improving either one of these properties have been found to exhibit a worsening of the other property. That is, the polymer compositions, PTFE-based or otherwise, developed for increased strength have been accompanied by reduction in their frictional abilities, i.e., an increased coefficient of friction and lowered erosion resistance, and vice versa.

Patent specification number GB-A-2166142 describes a PTFE-based polymer lined bearing exhibiting enhanced erosion resistant properties by virtue of a filler of an ionic fluoride, particularly a finely divided form such as calcium fluoride.

Patent specification No. GB-A-2279998 (WO95/02772) the contents of which are incorporated by reference, describes a plain bearing of the filled PTFE infiltrated sintered bronze type that is specifically intended as an oil lubricated bearing. The specification summarises the perceived situation in the art regarding reinforcement and filler materials that provide strength and wear resistance, namely stating that the use of "smooth" filamentary materials such as glass and aramid fibres per se that do not adhere to PTFE should be considered as unsuitable, before concentrating on the suitability of fibrillated aramid filaments (hereafter also referred to as aramid "fibres") and in addition thereto particulate ionic fluoride fillers to achieve a lining material having improved wear against cavitation erosion. It is found in practice that notwithstanding a wide range of variation in the amount of aramid fibres that provide a useful product, there is in addition to the aforementioned conflict of properties, restrictions brought about by employing such aramid fibres at the upper end of the range as the mush has a tendency to become tough and intractable, making it difficult to spread in other than a thick overlay.

It is an object of the present invention to provide a plain bearing that has a lining layer of reinforced, filled PTFE-based polymer infiltrated into a sintered metal matrix and has a higher fatigue strength and liquid erosion resistance better than hitherto, and a method of manufacturing such a bearing.

According to a first aspect of the present invention a plain bearing comprises a metallic backing, a sintered porous metal layer bonded to the backing and a lining layer infiltrated into the pores of the porous metal layer and overlying the sintered metal layer, said lining layer comprising PTFE containing 10–30% by vol. particulate wear-resistant filler, 2–10% by vol. fibrillated aramid fibres and 2–10% by vol. of a melt processable fluoropolymer.

Preferably the melt processable fluoropolymer is a copolymer of the group tetraflouoethylene-hexafluoropropylene (referred to herein as FEP), tetraflouoethylene-perfluoroalkylvinylether (referred to herein as PFA) and monofluoroalkoxy (referred to herein as MFA). More preferably the melt processable fluoropolymer is a copolymer of said FEP.

Preferably, the melt processable fluoropolymer is present in the lining layer to an amount of 5 to 8% by vol., and more preferably to an amount of 7% by vol. Furthermore, it is preferred that the fibrillated aramid fibre is present in the lining layer in an amount at least 50% by vol. of the melt processable fluoropolymer.

The filler may be any particulate filler known in the art as providing wear resistance in polymer bearing materials. Conveniently, it comprises principally or wholly an ionic fluoride, such as $CaF_2$, $MgF_2$, or $SrF_2$. preferably the inorganic filler is present in the lining layer to an amount in the range 15–20% by vol.

The fibrillated aramid fibres preferably have an average length in the range 0.2 to 1.0 mm and are present in the lining layer to an amount of 3 to 5% by vol.

In respect of the fibrillated aramid fibres and general method of manufacture the invention follows the aforementioned Patent specification No GB-A-2279998, namely the average length of the aramid fibres used in the invention may be 0.2 to 1.0 mm, their diameter prior to fibrillation may be 0.012 mm–0.015 mm, and the degree of fibrillation (as measured as Canadian Freeness) may be 200 (Du Pont method TM 0894-84, Reference TAPPI-T-227M-58).

In respect of the manufacture, and according to a second aspect of the present invention, a method of manufacturing a plain bearing comprises forming a laminar metallic backing strip, bonding thereto by sintering a porous metal layer, forming a mush of fibre-reinforced, filled, PTFE-based bearing material in a volatile lubricant, spreading the mush onto the porous metal layer, pressing the mush to infiltrate a part thereof into the porous metal layer and leave a lining layer overlying the porous metal layer, heating the combination to a first elevated temperature to remove volatile liquid components and a second elevated temperature to effect sintering of the PTFE component and cohesion of the bearing polymer, preparing the mush by mixing together:

(1) an aqueous slurry of particulate, wear resistant filler containing 10–30% by volume solid, (2) an aqueous dispersion of fibrillated aramid fibre containing 2–10% by volume solids, (3) an aqueous solution of melt processable fluoropolymer containing 2–10% by solids, (4) the remainder being an aqueous dispersion of PTFE; adding a lubricant to the mixture, coagulating the mixture to produce a precipitate to effect said spreadable mush form with said lubricant, heating said combination at a said first temperature in excess of 100° C. to remove said volatile components and heating said combination a said second temperature between 340° C. and 420° C. for a heating duration of at least 7 seconds.

Preferably the ingredients (1) to (4) of the preceding paragraph are mixed together prior to addition of the lubricant. In this specification, as in the art in general, the term "lubricant" is used to refer to a material adsorbable onto the surface of the PTFE to assist in distributing it within a mixture of other ingredients. Commonly and conveniently, toluene may be employed as such lubricant.

Pre-drying the mixture to a mush or paste, that is, removing most of the superfluous liquid at ambient temperature, is achieved by mechanical means such as centrifuging or pressing.

Preferably, to minimise the processing time, the second temperature is in the range 400° C. to 420° C., and the heating duration is in the range 30 to 50 seconds. Preferably range 44 to 46 seconds.

It has been found that the fatigue strength of the bearing lining as made with any specific formulation within the above mentioned ranges increases as a function of the duration for which it is sintered at elevated temperature.

The strength achieved is believed to be a product of duration and temperature; that is, a fatigue strength can be achieved in short time at higher temperature. This is, of course, contingent upon the perceived degradation of the polymers, particularly the PTFE which begins to become significant at temperatures above 400° C. Such degradation is, in practice, not found to present a problem at temperatures above this, even up to 450° C., for the durations envisaged to meet typical fatigue strength requirements for these materials.

In a typical manufacturing practice adopted by the applicant, a bearing in accordance with the aforementioned GB-A-2279998 initially at ambient room temperature has been passed in strip form through a continuous oven, of length 1.5 m and heated to approximately 400° C., at a travelling speed of 3 m/min such that, assuming that lining materials reach the oven temperature at approximately half distance, the lining is subjected to the 400° C. temperature for about 15 seconds.

It is found practicable, and in industrial terms cost effective, to sinter the polymer based bearing lining in accordance with the present invention at said second elevated temperature for the order of three times the aforementioned duration, about 45 seconds, to achieve significant increase in the fatigue strength of the lining, although this is subject to considerable variation, both in respect of duration and temperature, in accordance with time constraints imposed on the manufacturing process and properties required of the finished bearing. Such sintering may be performed in such a continuous oven by reducing the travelling speed and/or increasing the oven length, or may be performed as a batch process when longer times are readily attained.

The mush of lining material may optionally have added to it a pigment that gives a specific appearance to the finished bearing. The pigment may be any material commonly made available for such purpose that has no chemical deleterious effect on the lining, nor physically deleterious effects on the bearing properties, and which is able to withstand the relatively high PTFE sintering temperature for whatever duration and temperature are chosen to achieve the desired fatigue strength.

Is it known from GB-A-2196876 to enhance cavitation resistance in a PTFE-based lining polymer by incorporating a percentage of FEP (and/or PFA) and lead-tin alloy which effect between them a reported increase in wear strength and erosion resistance. An inter-polymer is formed as particles which serve as individual carriers of small particles of the lead-tin alloy to effect distribution of this heavier component throughout the lighter polymer components, and it is the alloy-carrying inter polymer particles which are pressed into a porous metal substrate and heated to produce the bearing.

The presence of the FEP (and/or PFA) is shown to increase the fatigue strength of the lining material but its presumed merits are compromised by a higher coefficient of friction than PTFE and poor wettability by low viscosity lubricants. The poor wettability and frictional properties are mitigated by the use of the lead-tin alloy.

In a metal-free lining layer there is not only the problem of the relatively poorer frictional properties of FEP (or other heat processable fluoropolymer) in the absence of the soft bearing metals but also the difficulties which result from using it in a wet lining mush rather than as the specific particulate form described in the above publication. In particular it is found to make the mush particularly slimy and difficult to handle on an industrial scale and with current manufacturing plant. The exact reason for this is not clearly understood, but it is believed to be due to the use of surfactants with the commercially available fluoropolymers.

However, the lining as defined in the present invention has been found to have acceptable frictional properties with superior fatigue strength and erosion resistance without the use of metallic components, and furthermore, by having a suitable percentage of fibrillated aramid fibres in relation to the heat processable fluoropolymer, about one half of the volume of the heat processable fluoropolymer, the mush resulting from their mixture in aqueous form and with an organic lubricant, is not excessively slimy and the resultant mush form is readily handled and worked using conventional equipment and procedures.

Figure 1:
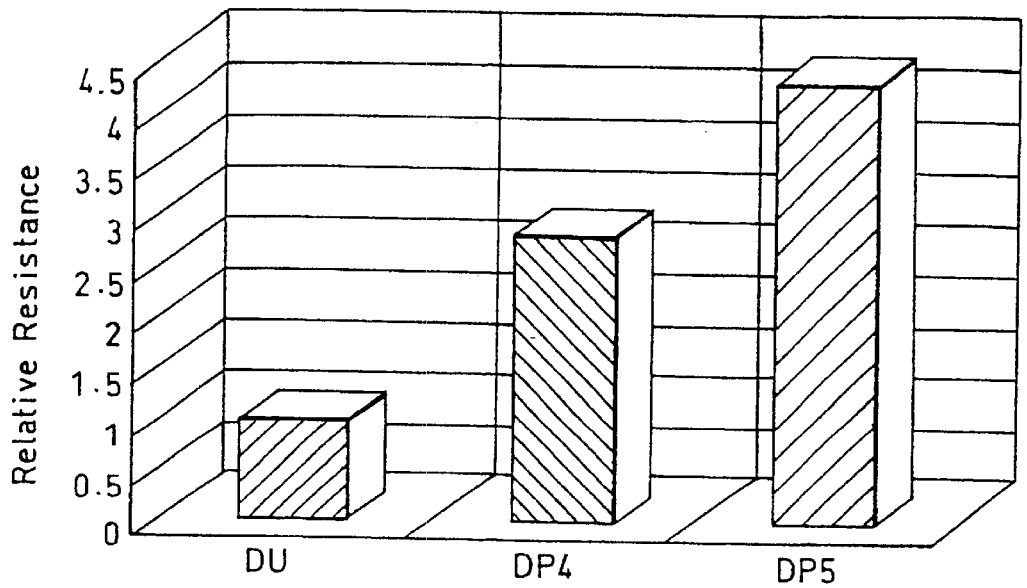
FIG. 1 shows a 3-dimensional histogram showing relative resistance to cavitation erosion of material according to the present invention and two other comparative materials.
Figure 4:
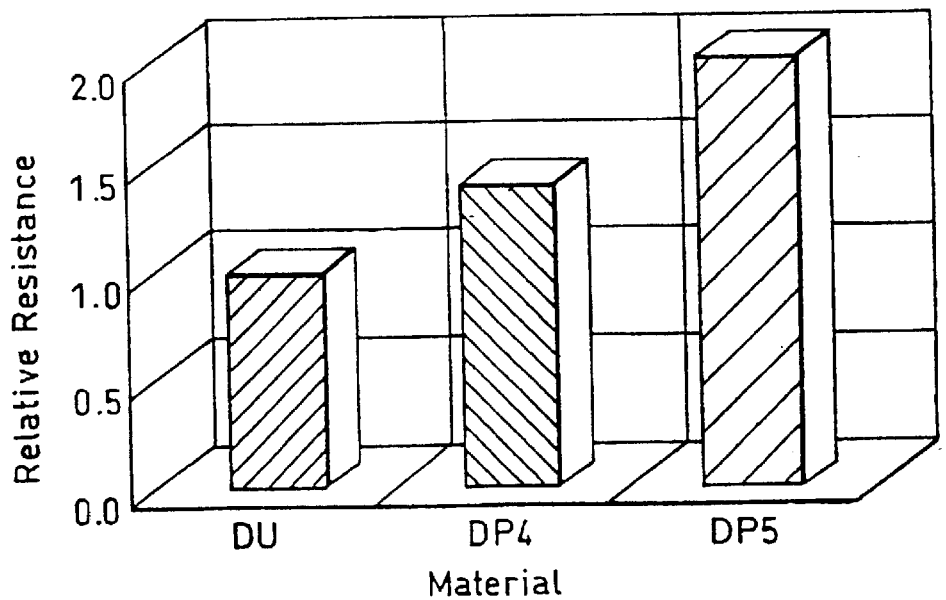

FIG. 4 which shows a similar histogram as FIG. 1 but for relative resistance to flow erosion rather than cavitation erosion.

There now follows an example which illustrates the invention.

Components (1) 1 liter of an aqueous dispersion of PTFE containing 800 g of solid PTFE,
(2) a slurry of 1 liter of water, containing 292 g of calcium fluoride,
(3) 1.45 liters of an aqueous solution of fibrillated aramid fibres (Kevlar RTM) containing 2% solid, and
(4) 100 ml of aqueous dispersion of FEP containing 77 g solid were mixed together in a laboratory mixer with a pigment having heat resistance up to 400° C. and conditioned with 400 ml toluene, as an organic lubricant, by mixing at 25° C. for 20 minutes.

The mixture was thereafter coagulated by adding 50 ml of 500 g/l concentration aluminium nitrate solution.

The supernatant liquid was decanted off and the slurry spun in a centrifuge at approximately 2800 rpm for 5 minutes to pre-dry it into a spreadable mush. The mush was spread onto a strip of steel-backed, porous sintered bronze substrate and rolled to infiltrate the mush into the substrate. The strip was then dried in air under radiant gas heaters to remove volatile agents from the mush, following which the strip was heated at (a second temperature) 400° C. for approximately 2 minutes.

The strip was then quenched with water to cool it and then rolled to give a predetermined thickness.

The lined bearing material thus produced exhibited a better fatigue resistance and better erosion resistance than the material described in the aforementioned GB-2279998 when used as a bearing within a gear pump lubricated by a low viscosity hydraulic oil forming the service liquid being pumped.

It is re-iterated that although the above example relates specifically to FEP, the other melt processable fluoropolymers mentioned process comparably and produce comparable results.

Bearings according to the example given above were produced and tested against other materials for comparison. The other materials were: "DU" a PTFE-based material containing 20 vol % lead; and, "DP4" a PTFE-based material containing about 20 vol % calcium fluoride and about 2.4 vol % fibrillated aramid fibre. The material according to the present invention was designated "DP5", the composition being PTFE/18 vol % calcium fluoride/4 vol % fibrillated aramid fibre/7 vol % FEP.

Tests were carried out to determine the relative resistance to cavitation erosion. The test conditions involved placing the tip of a vibrating amplifying horn connected to a 20 kHz piezo-electric transducer close to the surface of the material to be tested. Horn amplitude was 15 µm and test durations were for 30 min. The horn vibration causes vapour bubbles in the test oil located in the gap between the horn tip and material surface, the bubbles imploding on the surface of the sample material and causing cavitation erosion damage. FIG. 1 shows that the material according to the present invention was rated at over 4 compared with 1 of the "DU" standard material and about 2.5 for the "DP4" material.

Figure 2:
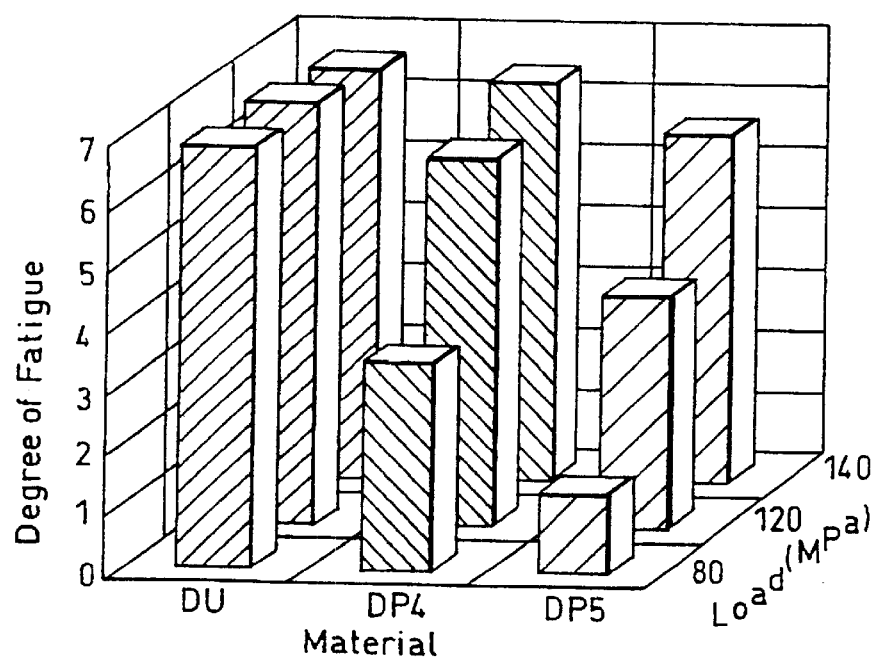
FIG. 2 shows a 3-dimensional histogram showing relative fatigue resistance vs load for the same materials as FIG. 1.
Figure 3:
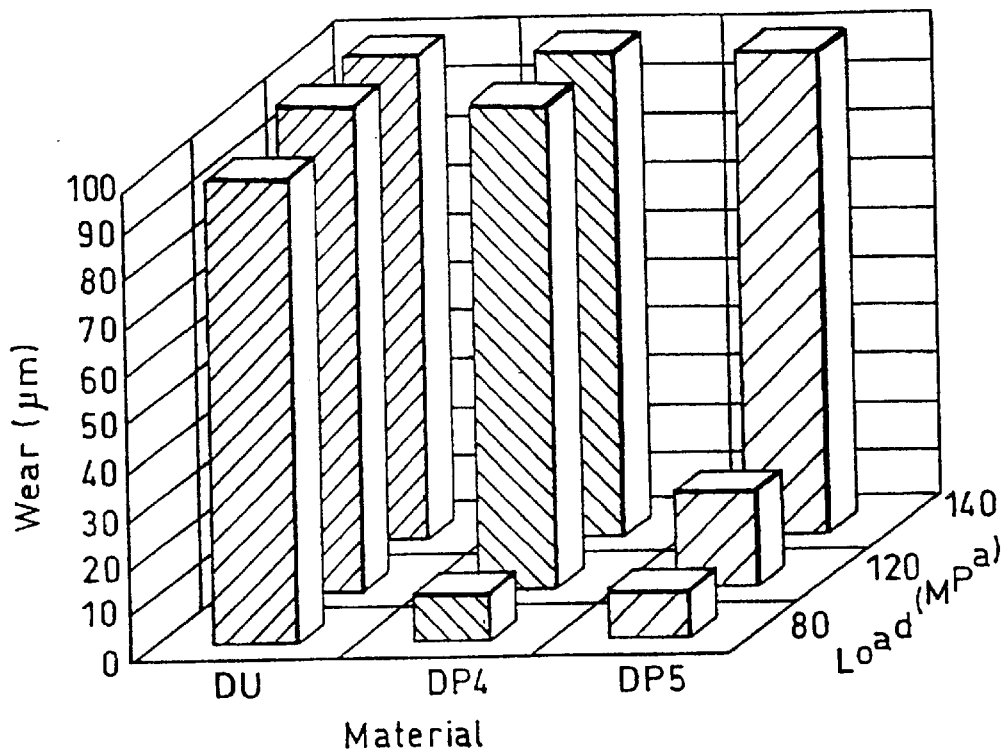
FIG. 3 shows a similar histogram as in FIG. 2 but showing wear vs load.

Fatigue and wear resistance tests were carried out on a known "Vulcan" (trade name) test rig. The apparatus comprises a test shaft running in bearings of the material to be tested and driven by an electric motor giving a shaft speed of 4.81 m/s. A load of 50 Mpa is applied hydraulically to the test bearings, the load being measured by strain gauges. The calculated "PV" factor was 240.5 N/mm$^2$×m/s and the, oil temperature was 94° C. The degree of fatigue was assessed by comparison with known standards. Wear was measured by depth of wear scar at the highest loaded point. FIG. 2 shows that the degree of fatigue of the material according to the present invention was considerably less than either of the two comparative test materials at loads of 80 and 120 Mpa and still lower at 140 Mpa. FIG. 3 shows the wear of the material of the present invention to be considerably less than the two comparative materials at intermediate loads of 120 Mpa.

FIG. 4 shows a 3-dimensional histogram indicating the superior resistance to flow erosion of the material according to the present invention. The tests were carried by pumping oil at a temperature of 60° C., at a pressure of 13.8 MPA, at a flow rate of 5 l/min through a clearance of 0.110 mm between a shaft and a bearing of the material for a time of 20 hours. The shaft finish was 0.15 Ra±0.05. As may be seen from FIG. 4, the "DU" material is rated at 1 and the material according to the present invention is rated at about 2, i.e. twice as resistant to flow erosion than "DU" at least 50% better than "DP4".

What is claimed is:

1. A plain bearing comprising a metallic backing, a sintered porous metal layer bonded to the backing and a lining layer infiltrated into the pores of the porous metal layer and overlying the sintered metal layer, said lining layer comprising PTFE containing 10% to 30% by volume particulate wear-resistant filler, 2% to 10% by volume fibrillated aramid fibres, and 2% to 10% by volume of a melt processable fluoropolymer.

2. A plain bearing according to claim 1, wherein said filler comprises principally or wholly an ionic fluoride.

3. A plain bearing according to claim 2, wherein said filler is calcium fluoride.

4. A plain bearing according to claim 1, wherein said filler is present in the lining layer in an amount of 15% to 20% by volume.

5. A plain bearing according to claim 1, wherein the fibrillated aramid fibres have an average length in the range of 0.2 mm to 1.0 mm and are present in the lining layer in an amount of 3% to 5% by volume.

6. A plain bearing according to claim 1, wherein the melt processable fluoropolymer is at least one copolymer selected from the group consisting of: tetrafluoroethylene-hexafluoropropylene, tetrafluoroethylene-perfluoroalkylvinylether and monofluoroalkoxy.

7. A plain bearing according to claim 6, wherein the melt processable fluoropolymer is a copolymer of tetrafluoroethylene-hexafluoropropylene.

8. A plain bearing according to claim 6, wherein the melt processable fluoropolymer is present in the lining layer in an amount of 5% to 8% by volume.

9. A plain bearing according to claim 6, wherein the melt processable fluoropolymer is present in the lining layer in an amount of 7% by volume.

10. A plain bearing according to claim 1, wherein the fibrillated aramid fibre is present in the lining layer in an amount at least 50% by volume of the melt processable fluoropolymer.

11. A method of manufacturing a plain bearing, the method comprising the steps of:
  forming a laminar metallic backing strip;
  bonding thereto a sintered porous metal layer;
  forming a mush of fibre-reinforced, filled, PTFE-based bearing material in a volatile lubricant by mixing together (1) an aqueous slurry of particulate, wear resistant filler containing 10 to 30% by volume solid, (2) an aqueous dispersion of fibrillated aramid fibre containing 2 to 10% by volume solids, (3) an aqueous solution of melt processable fluoropolymer containing 2 to 10% by volume solids, (4) the remainder being an aqueous dispersion of PTFE, spreading the mush onto the porous metal layer, pressing the mush to infiltrate a part thereof into the porous metal layer leaving a lining layer overlying the porous metal layer;

heating the combination to a first elevated temperature in excess of about 100° C. to remove volatile liquid components and to a second elevated temperature between approximately 340° C. and 420° C. for a heating duration of at least about 7 seconds to effect sintering of the PTFE component and cohesion of the bearing polymer; and adding a lubricant to the mixture, coagulating the mixture to produce a precipitate of said polymer and filtrate materials, and pre-drying the precipitate to effect said spreadable mush form with said lubricant.

12. A method according to claim 11, wherein said second temperature is in the range of 400° C. to 420° C.

13. A method according to claim 11, wherein said heating duration is in the range of 30 to 50 seconds.

14. A method according to claim 13, wherein said heating duration is in the range of 44 to 46 seconds.

15. A method according to claim 11 comprising mixing together said aqueous solution in a mixer prior to the addition of said lubricant.

16. A method according to claim 11, wherein the fibrillated aramid fibre is provided in an amount of at least 50% by volume of the melt processable fluoropolymer.

* * * * *